(12) United States Patent
Graham et al.

(10) Patent No.: US 8,980,381 B2
(45) Date of Patent: Mar. 17, 2015

(54) COATING FOR SENSING THERMAL AND IMPACT DAMAGE

(75) Inventors: Uschi M. Graham, Lexington, KY (US); Rajesh A. Khatri, Georgetown, KY (US)

(73) Assignee: Topasol LLC, Lexington, KY (US)

( * ) Notice: Subject to any disclaimer, the term of this patent is extended or adjusted under 35 U.S.C. 154(b) by 1348 days.

(21) Appl. No.: 11/847,326

(22) Filed: Aug. 29, 2007

(65) Prior Publication Data

US 2009/0304905 A1 Dec. 10, 2009

Related U.S. Application Data

(60) Provisional application No. 60/840,684, filed on Aug. 29, 2006.

(51) Int. Cl.
| | |
|---|---|
| *G01K 11/00* | (2006.01) |
| *C23C 16/52* | (2006.01) |
| *B05D 3/06* | (2006.01) |
| *B05D 5/00* | (2006.01) |
| *B05D 3/02* | (2006.01) |
| *G01M 11/08* | (2006.01) |

(52) U.S. Cl.
CPC .............. *B05D 5/00* (2013.01); *B05D 3/0254* (2013.01); *G01M 11/081* (2013.01); *B05D 2601/02* (2013.01); *B05D 2602/00* (2013.01)
USPC ............. 427/558; 427/8; 427/557; 374/161; 374/162

(58) Field of Classification Search
USPC ............... 73/150 R, 760, 762; 252/503, 962; 374/4, 5, 45, 46, 57, 100, 106, 162, 374/160, 161; 427/8, 212, 222, 145, 487, 427/492, 493, 508, 514, 532, 553, 595, 558, 427/557, 541, 543, 545
See application file for complete search history.

(56) References Cited

U.S. PATENT DOCUMENTS

| | | | |
|---|---|---|---|
| 4,179,926 A * | 12/1979 | Phillips et al. ................ 374/159 |
| 4,601,588 A * | 7/1986 | Takahara et al. .............. 374/106 |
| 4,729,671 A * | 3/1988 | Asano et al. .................. 374/160 |
| 5,633,049 A * | 5/1997 | Bilkadi et al. ................ 427/487 |
| 6,712,997 B2 * | 3/2004 | Won et al. ..................... 252/503 |
| 7,002,079 B2 | 2/2006 | Mitchell |
| 7,223,367 B1 | 5/2007 | Vossmeyer |
| 2004/0052957 A1 | 3/2004 | Cramer |
| 2004/0235997 A1 | 11/2004 | Meisenburg |
| 2007/0197383 A1 | 8/2007 | Koene |

OTHER PUBLICATIONS www.lunainnovations.com/technologies/impact.htm (last accessed Nov. 28, 2007).

* cited by examiner

*Primary Examiner* — Michael Wieczorek
(74) *Attorney, Agent, or Firm* — Francis Law PLLC; James M. Francis

(57) ABSTRACT

Coating compositions containing resins with dispersed nanoparticle precursors and methods for using said coatings as visual indicators of thermal and impact damage. The nanoparticle precursor/resin system reduces the nanoparticle precursor to its nanoparticle state when subjected to heat and/or physically impacted. The nanoparticles formed impart a color upon the coating at the point of exposure due to surface plasmon resonance. Microencapsulated leuco dyes are utilized to impart color when the coating is struck. The dye within the microcapsule is released as the microcapsule wall bursts or melts. Solubilizing agents can be utilized to improve the solubility of the nanoparticle precursor in the resin.

14 Claims, No Drawings

COATING FOR SENSING THERMAL AND IMPACT DAMAGE

CROSS REFERENCE TO RELATED APPLICATIONS

This application claims the benefit of U.S. Provisional Patent Application Ser. No. 60/840,684, entitled "Coating for Sensing Thermal and Impact Damage," filed Aug. 29, 2006, which is hereby incorporated by reference in its entirety.

FIELD OF ART

This invention generally relates to damage indicating coatings and methods of use More specifically this invention relates to aerospace coatings that react to temperature and impact by exhibiting a visually perceptible color change.

BACKGROUND

Coatings are applied to aircraft for a variety of reasons, including protection of paint layers, prevention of corrosion, reduction of radar signatures, screening from infrared or ultraviolet radiation, shedding of ice, and so on. An emerging area of coatings technology is smart coatings which have self-healing or sensing capabilities.

Composite materials have become widely used in a variety of aircraft aerospace and military applications including aircraft bodies, missile cones, and similar applications. A problem associated with composites is the potential for damage either by extreme temperature or by object impact and resulting delamination or cracking, which may not be easily detected without sophisticated non-destructive techniques such as ultrasonic inspection, x-ray microscopy, microscopic evaluation, infrared inspection and other spectroscopic techniques.

The coating used to protect the composite is itself recognized to be a possible means of detecting damage and visually assessing whether or not conduct a repair or simply consider further evaluation. One version of such a coating is believed to have been developed by LUNA Innovations and employs encapsulated dyes which break under impact to the coating to create visually perceptible indicators of damage. The aforementioned coatings which employ microencapsulated dyes to indicate the severity and point of impact in such a way that opaque color spots develop due to the leakage of dye from fractured microcapsules have significant limitations in (a) temperature and impact energy thresholds prior to indication of damage, (b) the strength and speed of the color development, as well as (c) being susceptible to the normal stability limits of organic dyes, particularly ultra-violet (UV) instability.

An object of the present invention is to provide smart "nano" coatings for detecting damage by employing a coating which will indicate thermal or mechanical stress by a color change.

Another object of the present invention is to provide methods of use for smart coatings that can indicate thermal and/or mechanical stress.

SUMMARY

The present invention is a novel coating composition that functions as an indicator of significant exposure to heat via color imparted by the creation of nanoparticles and can additionally be formulated to also indicate physical impact or pressure through the release of microencapsulated dyes or the reduction of nanoparticle precursors into their nanoparticle form. The purpose of using such a coating would be to alert the end user of potential damage from heat or low-velocity impact to surfaces coated with the novel composition. The coating utilizes nanoparticle pre-cursors that reduce to form nanoparticles under specific conditions. Preferably, these nanoparticle precursors will form nanoparticles when exposed to significant heat or upon impact or both. For a thermal event, color indicating nanoparticles are formed in-situ in the coating. In the case of physical impact, microencapsulated leuco dye will be released or a microencapsulated reducing agent will be released so that the nanoparticle precursor will be reduced to their nanoparticle state to form color by interaction with surrounding polymer material that may also contain additives. Furthermore, the threshold at which the coating indicates damage and the range of temperature and impact energy over which it is effective and prevents false positives is greatly extended over the present technology and customizable to specific thermal and impact events. The coating may be applied in a single layer or may be applied in multiple layers to provide enhanced event indication through the use of additional types of nanoparticle precursors.

It is anticipated that uses of such a material can include coatings for aircraft, spacecraft, ships, and bridges and can also provide coatings for security applications, such as safety wraps for shipping. Additional objects and advantages of the invention will be set forth in part in the description which follows, and in part, will be obvious from the description or may be learned by practice of the invention. The objects and advantages of the invention will be obtained by means of instrumentalities in combinations particularly pointed out in the appended claims.

DETAILED DESCRIPTION OF THE PREFERRED EMBODIMENTS

The following descriptions details compositions and methods for forming a transparent to opaque coating that serves as a visual indicator of exposure to thermal energy by the reduction of nanoparticle precursors and their subsequent transfixing in a polymeric resin system. The nanoparticles are preferably not formed in-situ during the curing of the coating but are formed during a thermal impact event to the already cured coating thereby imparting a color to the thermally exposed coating. The aforementioned color development is the result of the interaction of a metal nanoparticle or nanosphere or nanocluster with light in such a way that the electromagnetic field of the light induces a coherent dipolar Plasmon oscillation of the metal conduction electrons across the nanoparticle, or sphere or cluster. This is known as surface Plasmon resonance and is limited to the nanoscale only. Different nanoparticles can have unique optical properties and the size, shape and crystallinity of such particles all play a significant role in the color effect. For example, the brilliant colors of nanosized colloidal particles of Au, Ag and Cu were used in stained glass by alchemists. In the current work the color density of the thermally exposed coating depends largely on the highest temperature to which an area of the coating is exposed to and the duration of that exposure as well as concentration of nanoparticle precursor that can be reduced to form nanoparticles within the vicinity of the heat exposure.

A dual purpose coating contains both nanoparticle precursor material and microencapsulated leuco dye. The difference between a thermal or force impact event is easily visible due to difference in color produced as well as the pattern that develops, diffused (thermal) versus concentrated (impact).

In a two layered coating scenario the heat sensitive coating is arranged on top of the impact sensitive coating. No microencapsulated leuco dye is contained within the heat sensitive coating and no nanoparticles form in the impact sensitive coating. This segregation facilitates differentiation between heat damage and impact damage within the same coating system.

The mechanisms by which color is imparted to the coating include the heat induced reduction of nanoparticle precursor material to nanoparticles and the impact induced rupture or fracture of leuco dye containing microcapsules or reducing agent containing microcapsules.

The term "leuco dye" as used herein refers to any of a group of colorless dyes that undergo color change by adjusting the pH, or in non-aqueous media, by contact with materials containing acidic sites.

The term "in-situ" as used herein refers to any process which reduces nanoparticle precursors to nanoparticles within the resin system.

The term "nanoparticles" refers to particles having at least one dimension smaller than 100 nanometers and is not restricted to any particular geometric or shape.

The term "nanoparticle precursor" refers to a material capable of being chemically reduced to form nanoparticles capable of producing surface Plasmon resonance.

The nanoparticles in the coating impart color due to a phenomenon known as surface Plasmon resonance. Surface plasmons are electromagnetic waves that propagate along the nanoparticle-dielectric interface where the dielectric may be vacuum, air, water, glass, polymer or else. The Plasmon oscillations are extremely sensitive to any change such as caused by adsorption of molecules to the metal surface or growth of the particle or change in shape among others. Surface plasmon resonance typically occurs when light is reflected off thin metal nanoparticle containing objects such as thin films, glass sheets or coatings.

If a thin film containing noble metal nanoparticles (e.g. gold) is placed within a media with a high refractive index such as a transparent coating of the present invention, this reflection is not total; some of the light is "lost" into the metallic nanoparticles. There then exists a second angle greater than the critical angle at which this loss is greatest and at which the intensity of reflected light reaches a minimum or "dip". This angle is called the surface plasmon resonance angle ($\theta spr$). It is a consequence of the oscillation of mobile electrons in the conduction band (or "plasma") at the surface of the metal nanoparticles. These oscillating plasma waves are called surface plasmons.

When the wave vector of the incident light matches the wavelength of the surface plasmons, the electrons "resonate", hence the term surface plasmon resonance. The "coupling" of the incident light to the surface plasmons results in a loss of energy and therefore a reduction in the intensity of the reflected light. For a nanoparticle much smaller than the wavelength of light (nanoparticle $<<\lambda$). an electromagnetic field at a particular frequency (v) leads to the induction of a coherent oscillation of the free electrons across the metal nanoparticle (this oscillation is known as the surface Plasmon resonance which can occur at visible frequencies for a variety of metal nanoparticles (such as Au, Ag, Cu, Fe). This may be followed by a strong enhancement of absorption and scattering of additional electromagnetic radiation in resonance with the surface Plasmon resonance all of which is triggered by the origin of the surface plasmon oscillation of the metal electrons. The result can be tunable optical properties based on the phenomenon of surface Plasmon resonance of metal nanoparticles that are far superior to the absorption and or fluorescent dyes conventionally used in imaging and dyes described by LUNA for impact sensing. This can be confirmed by Mie Theory which estimates that optical cross sections of for example spherical gold nanoparticles are up to five orders of magnitude higher than those of conventional dyes (Jain, P. K., et al., J. Phys. Chem. B (2006) 110, 19220). To obtain a strong color effect, the amount of nanoparticle precursor in a coating can be significantly less compared to an equally intense color derived from dyes. The strongly enhanced surface Plasmon resonance scattering and absorption of a variety of metal nanoparticles provides a novel and highly effective class of color sensor agents for thermal and impact diagnostics.

Variations of color can be achieved by modification of the nanoparticle precursor and media. Multiple nanoparticle precursors can also be used and the combined wavelengths of refracted light will be perceived as one blended color. Examples of colors achieved through this process include, but are not limited to, the primary colors and shades of blues, reds, and yellows and derivative colors such as greens, purples, browns, oranges, blacks, and greys. This may be achieved in a single layer or in the coupling of multiple layers. The nanoparticle precursor material is the key material for detecting thermal damage by forming color due to the formation of nanoparticles. This color formation is permanent within the affected area of the coating, unlike organic dyes, which fade over time.

Additional pigments or dyes can be added to the coating to change its aesthetic appearance. The color of the surface onto which the coating is applied also plays a role in the choice of color and the color ultimately perceived by visual inspection.

The nanoparticle precursor is preferably ground or otherwise mechanically reduced into a fine powder to aid the introduction and even dispersion of the nanoparticle precursor into the resin. Ideally the mixture of resin and nanoparticle precursor material is substantially homogenized so that the effects imparted by the nanoparticles will be consistent across the applied coating.

In a preferred embodiment of the invention, a nanoparticle precursor material is dissolved into a resin system that cures to be substantially transparent so as to permit visibility of internal color development. The resin cures primarily due to its exposure to heat but the curing process could also be accelerated by reactants or catalysts microencapsulated either with or without the leuco dye. It is anticipated that some resin systems would be employed which are curable by various forms of radiation other than heat, such as UV, infrared, microwave, visible or gamma radiation. It is also anticipated that curing may involve the evaporation of a solvent utilized with the resin. The nanoparticle precursor is selected based upon the resin system and the shape and size of the nanoparticles desired. The cured coating forms a protective coat for painted or unpainted surfaces such as composites, metals, wood, and similar structural materials. The resin system typically comprises one or more cross-linkable resin bases such as polyurethane, polyacrylate, polyamide, polyester, or epoxy resin. It may also contain a second component which triggers the cross-linking of the base system and which may include an activator or catalyst.

The resin system is selected based upon the requirements of the specific application and anticipated thermal trigger event. As the resin cures under normal conditions, it is important that the nanoparticle formation is insignificant so that a false positive color development does not occur. A false positive color development is considered to be any positive color development below a desired threshold of thermal exposure.

The nanoparticle precursor is a metal salt such as $HAuCl_4$. Other metal salts that are effective are chlorides or nitrates of silver, copper, nickel, cobalt, manganese, tin, zinc, selenium, and so on. As a general rule these salts can be dissolved in the resin bases directly with mixing. Alternatively, a small amount of carrier fluid can be introduced to help solubilize the salts or to affect the threshold temperature at which the salts form nanoparticles.

The coating contains a one part base coating of non-aqueous or aqueous polymer of one of a number of materials known to those skilled in the art and containing some polar groups; such as polyvinyl alcohol, polyurethane, polyacrylate, polyester, polyols of ethylene, propylene, etc., polyacrylamides, epoxies of various compositions and combinations or derivatives thereof in the concentration range of 80-99.9% by mass, part of which may be a solvent intended to evaporate during coating curing.

The nanoparticle precursor is a material such as $HAuCl_4$, $AgNO_3$, $CuCl_2$ and in general, chlorides or nitrates of silver, copper, nickel, cobalt, manganese, tin, zinc, and selenium as non-limiting examples. These precursors can be used in combination and in varying concentration ratios to give desired color effects and reaction characteristics to form nanoparticles. The concentration range of the metal salt is 0.1% to 10% by mass of the total composition.

Above a threshold temperature, preferably above 100° C., but capable of being modified to provide indication at different temperature thresholds, by varied combinations of resin, nanoparticle precursors, and other chemicals that aid or impede the reduction of the metal precursor (e.g. amines), the nanoparticle precursor ions are reduced by functional groups in the coating material and/or solvent so as to precipitate as nanoparticles. The nanoparticles impart a color to the coating which depends on their size and shape. Size and shape are dependant upon the heat applied and the resin utilized as well as the selected nanoparticle precursor.

While the foregoing is sufficient for the creation of a coating which is indicative of thermal stress or damage, a two part base coating could also be utilized. For two part coatings a cross linking catalyst may be included such as magnesium oxide, calcium oxide, and many other types known to those skilled in the art.

Coatings that can be used as indicators of physical impact as well as exposure to extreme heat require that the nanoparticle precursor material supplemented resin also contain a colorless leuco dye contained in microcapsules. The nanoparticle precursor material serves as a reactant with the colorless dye or liquid reductants such as amines, alcohols, etc. contained within the microcapsules, helping to accelerate the rate of color development in the coating upon force impact. Support materials with Lowry and/or Brønsted acidic sites can be added to promote rapid color development upon force impact, such as nano- or micron sized montmorillonite clays, amorphous silicas (such as Aerosil), aluminas, and similar materials. Such materials can be added at concentrations between 0.5% up to 20% (by mass), but are preferably added at 0.5% to 2% (by mass). Color development upon impact can be varied by changes in type of concentration of the nanoparticle precursor material, the support material, addition of dye developing agents, base coating composition (i.e. polyvinyl alcohol, polyurethane, polyurethane acrylates, epoxies etc.) or by changing the microcapsule wall strength and/or microcapsule size and internal colorless dye and solvent composition. The leuco dyes employed in the present invention are colorless until activated by a pH change or exposure to acidic sites on solid materials such as silicas, clays, aluminas, and other materials known to those skilled in the art.

Microcapsules of colorless dyes such as crystal violet Intone (CVL) can be incorporated into the composition so as to break upon impact. The microcapsules are formed by various methods known to those skilled in the art, coacervation being one such method. Various encapsulation wall materials may be utilized, such as urea formaldehyde, melamine urea formaldehyde, and similar compounds. The CVL or another colorless dye can be dissolved in one or more useful solvents such as xylene, toluene, di-isopropylnaphthenate or similar solvents for the purpose of making a non-aqueous liquid encapsulant. The colorless dye is preferably dissolved in the solvent at a 10% (by mass) concentration or less and microcapsules are added into the coating at any amount that can be usefully incorporated into the coating without inhibiting other useful properties and also related to the base coating material, but typically between 2% to 20% (by mass). Similarly reductant can be encapsulated by first making an emulsion of aqueous reductant in one of the aforementioned solvents, and then proceeding with the encapsulation.

Additionally, the use of microencapsulated dyes could also be utilized to extend the useful temperature range of the thermal indicator. The materials used in the encapsulation walls of the microencapsulated dyes can be selected based upon their melting points, thus providing another indicator of thermal damage.

A small amount of solubilizing agent for the nanoparticle precursor, such as ethanol or other polar solvent, may be included, from 0.1 to 10% (by mass) of the total composition. The solubilizing agent can also affect the reduction reaction of the nanoparticle precursor so that it occurs more or less easily. The solubilizing agent can also take the form of an emulsion or microemulsion of the aqueous solution of nanoparticle precursor. Other coating materials known to those skilled in the art such as dispersants, de-aerating agents, anti-corrosion agents, UV stabilizers, wetting agents, thickening agents and so forth are useful in alternative embodiments.

Developing agents such as lauryl gallate can be used to help maintain color stability once the capsule is broken and the colored form of the dye is produced. A number of developing agents and colorless dyes/developing agents of the types used in carbonless paper and photography are known to those skilled in the art. Microcapsules of 1-50 microns size of this composition are of use. Developing agents are typically added at equimolar concentrations or less relative to the colorless dye amount.

When the coating of the present invention is applied to a surface, typically at coating thickness of 10 to 1000 mils, it dries to a clear layer. Alternatively other pigments can be introduced into the coating as well, provided that they do not interfere with visible color development from the nanoparticles. The coating can then be cured, usually at temperatures ranging from 25° to 80° C. During and after the cure the coating remains clear and the nanoparticles do not form.

The following examples are for illustrative purposes only and are not intended to be limiting in their disclosures.

EXAMPLES

Example 1

In another embodiment of the invention, the commercially available aircraft clear coating SEI CPT-310, is two part polyurethane with a base component and activator component. The base and activator are combined in the ratio of 2:1 and cured by heating to 60° C. for 40 minutes.

To form the coating of the present invention the nanoparticle precursor salt, $HAuCl_4$, is dissolved directly into the SEI CPT-310 base component at the desired concentration. Several concentration levels of salt were prepared. Then the precursor-containing base was mixed 2:1 with the activator, coated out on glass plates at 1-6 mil thickness and cured.

The resulting coating on glass plate was heated at different temperatures to determine the threshold temperature above which the coating began to display color as the result of nanoparticle formation.

TABLE I

Color imparted by coatings of Example 1 applied at 4 mil thickness utilizing HAuCl4 as the nanoparticle precursor

| Temp. (° C.) | Wt. $HAuCl_4$ (g) | | | | |
|---|---|---|---|---|---|
| | 0.001 | 0.002 | 0.003 | 0.004 | 0.005 |
| 50 | clear | clear | clear | clear | clear |
| 100 | clear | clear | clear | clear | clear |
| 150 | pale purple | pale purple | med. purple | blue | blue |
| 200 | pale pink | pink | purple | blue | blue |

Example 2

The commercially available aircraft clear coating Desotto CA8201 is a two part polyurethane with a base component and activator (CA8000B) component. The base and activator are combined in the ratio of 2:1 and allowed to cure at room temperature for at least 24 hours or up to seven days.

To form the coating of the present invention the nanoparticle precursor salt, $HAuCl_4$, was dissolved directly into the CA8201 base component at the desired concentration. Several concentration levels of salt were prepared. Then the precursor-containing base was mixed 2:1 with the activator, coated out on a glass plates at 1-6 mil thickness and cured.

The resulting coating on glass plate was heated at different temperatures to determine the threshold temperature above which the coating began to display color as the result of nanoparticle formation.

TABLE 2

Color imparted by coatings of Example 2 applied at 4 mil thickness utilizing HAuCl4 as the nanoparticle precursor

| Temp. (° C.) | Wt. $HAuCl_4$ (g) | | | | |
|---|---|---|---|---|---|
| | 0.001 | 0.002 | 0.003 | 0.004 | 0.005 |
| 50 | clear clear | clear | clear clear | clear | clear clear |
| 100 | pale blue pale blue | pale blue | pale blue pale blue | pale blue | pale blue pale blue |
| 150 | pale purple pale purple | pale blue | pale blue pale blue | pink | pink |
| 200 | orange orange | orange-purple | pink-purple | pink-purple | pink-purple |

Example 3

Another embodiment of the present invention employs a 10% by mass solution of polyvinyl alcohol in 10 grams of water, 2.2 g Melamine-urea formaldehyde microcapsules of CVL in xylene, 0.22 g Aerosil R972 (silica), and 0.03 g $HAuCl_4$. The foregoing formulation creates a fairly soft coating, light yellow in color when cured at 40° C. and turns vivid green immediately upon very light impact, such as pressing a finger into the coating or a gentle hammer strike.

Example 4

Yet another embodiment of the present invention utilizes $HAuCl_4$ at 0.8% by mass, 10% by mass solution of polyvinyl alcohol in water at 88% by mass, Melamine-urea formaldehyde microcapsules of crystal violet lactone (CVL) in xylene at 10% by mass, and Aerosit R972 (silica) (available through Degussa) at 1% by mass. This formula produces a fairly hard coating, light yellow in color when cured at 70° C. and turns blue-green upon heavier impact such as a forceful hammer blow.

Example 5

Another useful embodiment uses 2.4 g, PVA, 0.18 g Solsperse 41090 (dispersant) (available through Noveon), 0.23 g melamine-urea formaldehyde microcapsules of CVL and lauryl gallate in a 1:1 ratio in xylene, 0.03 g Aerosil R972, and 0.03 g $HAuCl_4$.

Example 6

Another useful embodiment uses 10 grams of an aqueous PVA solution (10% by mass PVA in water) to which 0.02 grams of $HAuCl_4$ is added. This solution is coated on a glass slide and cured at a temperature below 40° C. Upon heating above 80° C., the coating turns bright red.

What is claimed is:

1. A method of forming a surface thermal and/or mechanical stress indicating coating, said method comprising the steps of:
   (a) applying a substantially transparent coating to a surface, said coating comprised of at least one inorganic nanoparticle precursor material and a curable resin applied in at least one layer, said resin capable of facilitating a heat induced chemical reduction of said at least one inorganic nanoparticle precursor material which creates a plurality of inorganic nanoparticles within said coating which impart a color change to said coating; and
   (b) curing said coating on said surface.

2. The method of claim 1, wherein said inorganic nanoparticle precursor material is finely ground prior to introduction into said resin.

3. The method of claim 1, wherein said inorganic nanoparticle precursor material is substantially evenly dispersed throughout said coating.

4. The method of claim 1, wherein at least one said inorganic nanoparticle precursor material is a metal salt capable of being reduced to elemental metal.

5. The method of claim 4, wherein said inorganic metal salt contains is comprised a metal selected from the group consisting of Au, Ag, Bi, Cr, Ca, Cu, Fe, Mn, Ni, Pt, Sb, Se, Sn and Zn.

6. The method of claim 4, wherein said inorganic metal salt is crystalline $HAuCl_4$.

7. The method of claim 1, wherein said at least one inorganic nanoparticle precursor material is a silicate.

8. The method of claim 1, wherein said method further comprises dispersing a plurality of microcapsules containing a leuco dye into said resin, wherein said microcapsules have microcapsule walls which rupture when exposed to sufficient impact stress thereby releasing said leuco dye into said coating and initiating a color change in said coating.

9. The method of claim 8, wherein said method further comprises the step of inspecting said coating for a color change.

10. The method of claim 1, where said curing of said coating is initiated by exposure to pressure or radiated energy comprised of the group consisting of heat and ultraviolet radiation under normal curing conditions for said coating but below the threshold conditions at which said inorganic nanoparticles form.

11. The method of claim 10, further comprising the step of adding trace elements to said resin prior to its application to said surface, wherein said trace elements act to change the threshold level at which nanoparticles form.

12. The method of claim 10, further comprising the step of adding trace elements to said resin to affect said color change imparted by said inorganic nanoparticles to said coating.

13. The method of claim 1 wherein said inorganic nanoparticle precursor is added to said resin in at least one liquid solubilizing carrier selected from the group consisting of water, ethylene glycol, propylene glycol, organic amines, alcohols, vegetable oil, mineral oil, and functionalized molecules.

14. The method of claim 1, wherein said substantially transparent coating further comprises a microencapsulated leuco dye and a microencapsulated activating agent.

* * * * *